US008431856B2

(12) United States Patent
Kaeppeler et al.

(10) Patent No.: US 8,431,856 B2
(45) Date of Patent: Apr. 30, 2013

(54) INNER BURNER FOR ELECTRIC ARC WIRE SPRAYING

(75) Inventors: Albert Kaeppeler, Stuttgart (DE); Eyuep Akin Oezdeniz, Walheim am Neckar (DE); Patrick Izquierdo, Ulm (DE)

(73) Assignee: Daimler AG, Stuttgart (DE)

(*) Notice: Subject to any disclaimer, the term of this patent is extended or adjusted under 35 U.S.C. 154(b) by 373 days.

(21) Appl. No.: 12/866,058

(22) PCT Filed: Jan. 8, 2009

(86) PCT No.: PCT/EP2009/000058
§ 371 (c)(1),
(2), (4) Date: Aug. 4, 2010

(87) PCT Pub. No.: WO2009/097943
PCT Pub. Date: Aug. 13, 2009

(65) Prior Publication Data

US 2010/0320175 A1 Dec. 23, 2010

(30) Foreign Application Priority Data

Feb. 8, 2008 (DE) ......................... 10 2008 008 169

(51) Int. Cl.
*B23K 9/04* (2006.01)

(52) U.S. Cl.
USPC .......................................... 219/76.14; 239/79

(58) Field of Classification Search ............... 219/76.14; 239/79
See application file for complete search history.

(56) References Cited

U.S. PATENT DOCUMENTS

| | | | |
|---|---|---|---|
| 6,559,416 | B1 | 5/2003 | Steenis et al. |
| 2006/0124762 | A1 | 6/2006 | Schach |

FOREIGN PATENT DOCUMENTS

| | | | |
|---|---|---|---|
| BE | 403295 | A | 6/1934 |
| DE | 10243739 | B3 | 5/2004 |
| GB | 455775 | A | 10/1936 |

*Primary Examiner* — Douglas Menz
(74) *Attorney, Agent, or Firm* — Patent Central LLC; Stephen A. Pendorf

(57) ABSTRACT

The invention relates to an inner burner (1) for electric arc wire spraying of hollow spaces, particularly cylinder bearing surfaces (9), comprising two meltable electrodes which are supplied in two feed channels (5) to a discharge nozzle (6) of the inner burner (1). The two electrodes are connected to two sliding contacts (4) for electrical energy transmission. According to the invention, the two sliding contacts (4) are displaceably mounted in the axial direction (10) and are each connected to a guide element (7) which is also displaceably mounted in the axial direction (10). The respective guide element (7) is axially pretensioned via at least one associated spring (11) and thereby presses the sliding contact (4) against the electrode, wherein the feed channels (5), the sliding contacts (4) and the guide elements (7) are arranged parallel to one another in the spraying head (2).

4 Claims, 2 Drawing Sheets

INNER BURNER FOR ELECTRIC ARC WIRE SPRAYING

Figure 1:
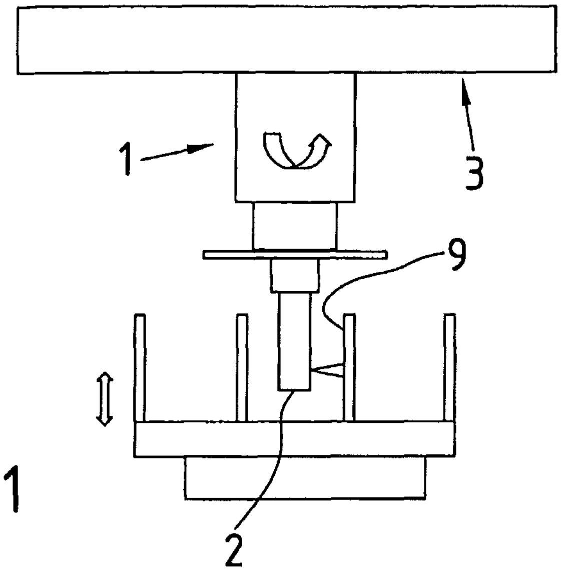

The present invention relates to an inner burner for electric are wire spraying of hollow spaces, particularly cylinder bearing surfaces according to the preamble of claim 1.

With the so-called electric arc wire spraying, two metallic wires are usually moved in the spray gun by means of a regulated wire feed speed by means of coppery sliding contacts, through which the current transfer takes place. After switching on the wire feed, the two spraying wires converge to each other by the wire guide until they contact. In the contact point, a heating results due to the high short circuit current, whereby the coating material melts on. A gas flow exiting from a nozzle, usually compressed air, atomizes the resulting melting material, accelerates the particles and throws them onto the surface to be coated.

From DE 102 43 739 B3 is known a generic inner burner for electric arc wire spraying of hollow spaces with at least two electrodes provided for melting. For transmitting the electrical energy to the electrodes, two sliding contacts are provided, which are pressed against the surface of the associated electrode by means of a spring.

From DE 10 2005 012 360 A1 is known a further electric arc wire spraying burner for electric arc wire spraying, which has two burner tubes for feeding electrodes formed as wire. The electrodes are thereby guided through the burner tubes in the direction of the surface to be coated, wherein the wire is guided via a deflecting device having rotatably mounted guide and/or sliding elements, by means of which the wire is deformed in the elastic region. A sliding contact for transmitting electrical energy to the electrodes is also known hereby, which is pressed against the surface of the electrode by means of a spring.

The reliable contacting between the electrode on the one hand and the sliding contacts on the other hand is achieved in the state of the art in that special spring devices are provided, which press the sliding contacts against the electrodes. These spring devices are however elaborate and expensive and require an installation space which is not to be underestimated.

The present invention concerns the problem to give an improved embodiment for a generic inner burner, which is in particular more compact.

This problem is solved according to the invention by the subject of the independent claim. Advantageous embodiments are the subject of the dependent claims.

The invention is based on the general idea to mount the sliding contacts for transmitting the electrical energy to the electrodes in a displaceable manner in the axial direction and to pretension them indirectly in the axial direction with guide elements connected via the sliding contacts, wherein the guide elements are connected to a respective face side of the associated sliding contact on the face side and wherein the sliding contacts, the guide elements and at least two feed channels for feeding electrodes to a discharge nozzle of the inner burner according to the invention are arranged parallel to one. The two electrodes are thereby formed as wires that can be burnt in an electric arc. The parallel arrangement of the feed channels, the sliding contacts and the guide elements and the axial pretensioning of the guide elements and of the sliding contacts connected therewith enables a very compact design compared to the state of the art, as the spring for pretensioning the respective sliding contact can be installed in a similar installation space-beneficial manner as the spring in a ballpoint pen. With comparable embodiments in the state of the art, the sliding contacts were always pressed against the electrode via separately arranged spring devices, which led to a considerably increased installation space requirement. A reduction of the size of the spraying head permits a use of the inner burner according to the invention compared to the state of the art in a considerably lower bore diameter and thus the coating of considerably smaller hollow spaces, in particular considerably smaller cylinder bearing surfaces. The suggested solution can furthermore be realized in a very simple constructive manner and with a considerably lower part number compared to the state of the art, whereby the inner burner can altogether be produced in a more cost-efficient manner.

In an advantageous embodiment of the solution according to the invention, at least two feed channels are angled in the region of the discharge nozzle, wherein the sliding contacts are formed and arranged in such a manner that they press the electrodes in the region of the discharge nozzle against an inner wall of a feed channel. This offers the great advantage that the two electrodes are guided in the region of the discharge nozzles by the sliding contacts on the one hand and the feed channels on the other hand and thereby take up a position to one another that can be predefined in an exact manner, which is in particular of great importance for the quality of the electric arc wire spraying.

In a further advantageous embodiment of the solution according to the invention, the discharge nozzle, the guide elements, the feed channels and the sliding contacts are part of an exchangeable spraying head of the inner burner. The combination of the above-mentioned components in the spraying head formed in an exchangeable manner offers the particular advantage to considerably simplify the maintenance of the inner burner, as only the spraying head has to be exchanged routinely or if necessary. It is hereby conceivable that the spraying head designed in such a manner can be connected to the inner burner via simple plug or screw connections, so that an assembly or a disassembly of the spraying head can be accomplished in a simple and thus cost-efficient manner.

Further important characteristics and advantages of the invention result from the dependent claims, the drawings and the associated description of the figures by means of the drawings.

It is obvious that the above-mentioned characteristics and which will still be explained in the following cannot only be used in the respectively given combination, but also in other combinations or on their own without leaving the scope of the present invention.

Preferred embodiments of the invention are shown in the drawings and are explained in more detail in the following description, wherein the same reference numerals relate to the same or similar or components which are functionally the same.

Figure 2:
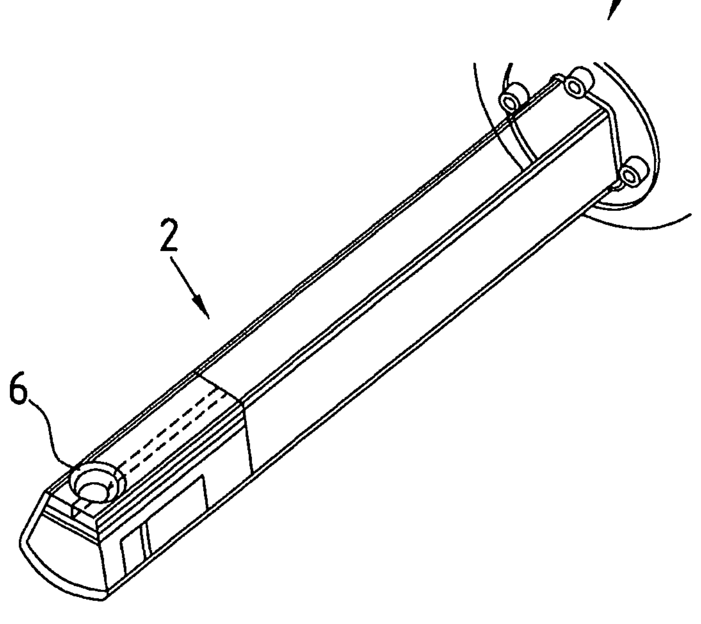
Figure 3:
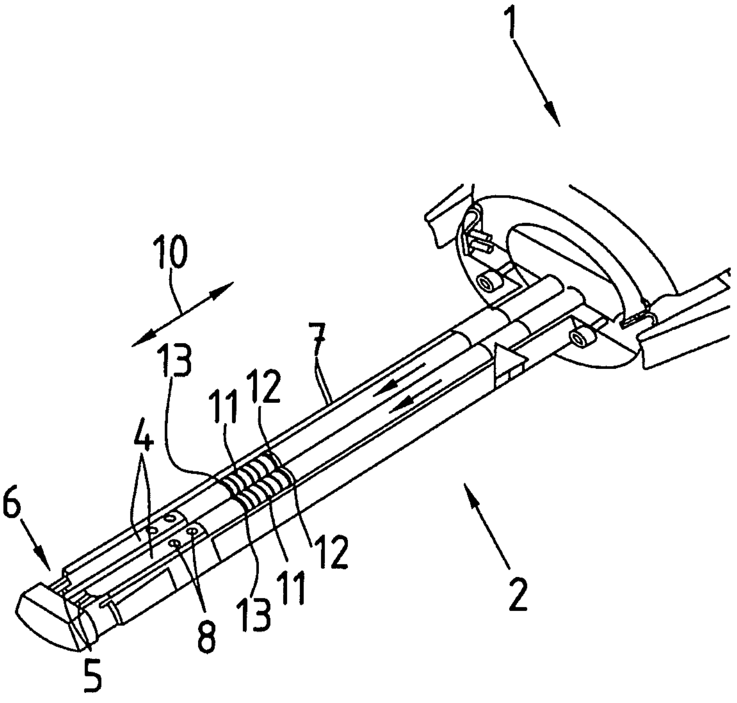

It thereby shows, respectively schematically,

FIG. 1 a view of the inner burner according to the invention,

FIG. 2 a detailed depiction of a spraying head of the inner burner,

FIG. 3 a depiction as in FIG. 2, but with an open spraying head.

According to FIG. 1, an inner burner 1 according to the invention has a spraying head 2, wherein the inner burner 1 is connected to an electric arc wire spraying plant 3. The inner burner 1 is thereby used for electric arc wire spraying of hollow spaces, particularly cylinder bearing surfaces 9. Such a cylinder bearing surface 9 is for example shown in FIG. 1, wherein at least the spraying head 2 of the inner burner 1 is mounted in a rotatable manner for their coating and the inner burner 1 itself can be adjusted vertically, so that an even coating of the cylinder bearing surface 9 is possible. A coating of the hollow spaces thereby takes place by melting of electrodes that can be burnt in an electric arc wire and formed as wires, which are in contact with two sliding contacts 4 for transmitting electrical energy (see FIG. 3). The sliding contacts 4 were conventionally previously pressed against the electrodes by means of spring devices arranged orthogonally to the electrodes, for example by means of spiral springs, so that a reliable and steady contact could be ensured between the electrodes on the one hand and the sliding contacts 4 on the other hand. Spring devices arranged in such a manner however need an installation space that cannot be underestimated, which restricts the usage possibilities of an inner burner, particularly with low inner diameters, that, is, small cylinders.

The inner burner 1 according to the invention further has at least two feed channels 5 for feeding the electrodes to a discharge nozzle 6 at the spraying head 2. The sliding contacts 4 are thereby arranged or formed in such a manner that they press the electrodes in the region of the discharge nozzle 5 against an inner wall of a feed channel. The electrodes are thereby held in position in the region of the discharge nozzle 6 by a part of the feed channels 5 on the one hand and by the associated sliding contacts 4 on the other hand, whereby it can be ensured that the two electrodes can be guided to each other in a position that is always predefined and thus exactly aligned. The sliding contacts 4 are thereby essentially pressed against the electrodes in the region of the discharge nozzle 6, wherein the feed channels 5 are formed angled in the region of the discharge nozzle 6. In the feed direction in front of the discharge nozzle 6, the feed channels 5 proceed essentially parallel to the sliding contacts 4 or to guide elements 7 arranged at the face side of the sliding contacts.

According to FIG. 2, a spraying head 2 of an inner burner 1 according to the invention is shown, wherein its slim form can clearly be seen. This slim form enables to use the inner burner 1 for coating hollow spaces with a diameter of >60 mm.

With the inner burner 1 according to the invention, the sliding contacts 4 are now mounted in a displaceable manner in the axial direction 10 and are connected to a guide element 7 which is also mounted displaceably in the axial direction 10 (see FIG. 3). The respective guide element 7 is thereby pretensioned axially similar to a refill in a ballpoint pen and thereby presses the associated sliding contact 4 against the electrode. As can be seen in FIG. 3, the feed channels 5, the sliding contacts 4 and the guide element 7 are thereby arranged parallel to one another in the spraying head 2, whereby a very compact design of the spraying head 2 can be achieved. This enables a use of the inner burner 1 according to the invention even with considerably lower inner diameters, so that smaller cylinders can also be coated with the electric arc wire spraying method.

Similar to a ballpoint pen, the two springs 11 according to FIG. 3 are formed as spiral springs and wind around the respectively associated guide element 7 in the circumferential direction. The respective spring 11 is supported at a collar 12 on the guide element side on the one hand and at a housing 13 of the spraying head 2 on the other hand, for example at a panel, not designated in detail. It is hereby also conceivable that, in addition to the springs 11 shown in FIG. 3, further springs, not shown, are provided in the region of the inner burner 1, which springs also pretension the two guide elements 7 in the direction of the discharge nozzle 6 and thereby support the two springs 11 in their pretension action.

According to FIG. 3, it can further be seen that the two sliding contacts 4 are formed as strip-like metal plates, which are connected to guide elements 7 via corresponding connection means 8, for example rivets.

The sliding contacts 4 are preferably formed of copper or a copper alloy. Copper has a high electrical conductivity, whereby the electrical resistance can be kept low.

The discharge nozzle 6, the guide elements 7, the feed channels 5 and the sliding contacts 4 are conveniently part of a spraying head 2, that can altogether be exchanged, whereby a particularly simple and thus cost-efficient maintenance of the inner burner can be ensured.

The following advantages can generally be realized by the inner burner 1 according to the invention: A cost saving by a reduction of the individual inner burner components, as the previously necessary spring devices are omitted, lower operating costs, lower maintenance costs, reduced downtimes by reduced assembly effort and an increased usage spectrum due to the compact design.

The invention claimed is:

1. An inner burner (1) for electric arc wire spraying of hollow spaces, particularly cylinder bearing surfaces (9), with
- at least two electrodes provided for melting, which electrodes are wires that can be melted in an electric arc,
- at least two feed channels (5) for feeding the electrodes to a discharge nozzle (6) of the inner burner (1), and
- at least two sliding contacts (4) for transmitting electrical energy to the electrodes, wherein
- the two sliding contacts (4) are displaceably mounted in the axial direction (10) and are respectively connected to a guide element (7) that is also displaceably mounted in the axial direction (10),
- the feed channels (5), the sliding contacts (4) and the guide elements (7) are arranged parallel to one another up to the region of the discharge nozzle (6), and the feed channels (5) are formed in an angled manner in the region of the discharge nozzle (6), and
- each respective guide element (7) is axially pretensioned via respectively at least one associated spring (11) and thereby presses the associated sliding contact against the electrode, such that the sliding contacts (4) press the electrodes against an inner wall of the feed passage in the region of the outlet nozzle (6).

2. The inner burner according to claim 1, wherein the discharge nozzle (6), the guide elements (7), the feed channels (9) and the sliding contacts (4) are part of an exchangeable spraying head (2).

3. The inner burner according to claim 2, wherein the spring (11) at the respective guide element (7) includes a spiral spring, which winds around the associated guide element (7) in the circumferential direction and is supported at a collar (12) on the guide element side on the one hand and at a housing (12) of the spraying head (2) on the other hand.

4. An inner burner (1) for electric arc wire spraying of hollow spaces, particularly cylinder bearing surfaces (9), with
- at least two electrodes provided for melting, which electrodes are wires that can be melted in an electric arc,
- at least two feed channels (5) for feeding the electrodes to a discharge nozzle (6) of the inner burner (1), and
- at least two sliding contacts (4) for transmitting electrical energy to the electrodes, wherein
- the two sliding contacts (4) are displaceably mounted in the axial direction (10) and are respectively connected to a guide element (7) that is also displaceably mounted in the axial direction (10),
- the feed channels (5), the sliding contacts (4) and the guide elements (7) are arranged parallel to one another up to the region of the discharge nozzle (6), wherein the feed channels (5) are at least in part covered by the guide elements (7), and the feed channels (5) are formed in an angled manner in the region of the discharge nozzle (6), and each respective guide element (7) is axially pretensioned via respectively at least one associated spring (11) and thereby presses the associated sliding contact against the electrode, such that the sliding contacts (4) press the electrodes against an inner wall of the feed passage in the region of the outlet nozzle (6).

* * * * *